United States Patent [19]
Matzinger

[11] Patent Number: 6,045,606
[45] Date of Patent: Apr. 4, 2000

[54] WATER-BASED INK JET INK COMPOSITIONS CONTAINING CARBOXYLATED LIGNIN

[75] Inventor: Michael D. Matzinger, Mt. Pleasant, S.C.

[73] Assignee: Westvaco Corporation, New York, N.Y.

[21] Appl. No.: 09/262,468

[22] Filed: Mar. 4, 1999

[51] Int. Cl.⁷ .................................................. C09D 11/00
[52] U.S. Cl. ................................... 106/31.27; 106/31.58; 106/31.43; 106/31.75; 106/31.86
[58] Field of Search .............................. 106/31.27, 31.57, 106/31.58, 31.43, 31.49, 31.75, 31.86, 31.87, 31.77, 31.78

[56] References Cited

U.S. PATENT DOCUMENTS

| | | |
|---|---|---|
| 4,891,070 | 1/1990 | Dilling et al. ............................. 106/26 |
| 5,500,023 | 3/1996 | Koike et al. ................................. 8/499 |
| 5,641,346 | 6/1997 | Mantell et al. ....................... 106/31.58 |
| 5,702,510 | 12/1997 | Yoshida et al. ......................... 106/31.6 |
| 5,888,253 | 3/1999 | Yamamoto et al. ........................ 8/466 |
| 5,902,387 | 5/1999 | Suzuki et al. ......................... 106/22 R |

*Primary Examiner*—Helene Klemanski
*Assistant Examiner*—Veronica F. Faison
*Attorney, Agent, or Firm*—Terry B. McDaniel; Daniel B. Reece, IV; Richard L. Schmalz

[57] ABSTRACT

An ink jet ink composition is disclosed comprising (a) from about 40% to about 98% of a water-based solvent system (carrier medium), (b) from about 1% to about 20% of one or more colorants, and (c) from about 0.1% to about 20% of carboxylated lignin. It has been found that ink jet ink formulations in accordance with this invention have improved water resistance properties while achieving excellent print quality, jetting properties, storage stability, reliability, and drying times.

29 Claims, No Drawings

WATER-BASED INK JET INK COMPOSITIONS CONTAINING CARBOXYLATED LIGNIN

BACKGROUND OF THE INVENTION

1. Field of the Invention

The present invention relates to ink compositions for use in ink jet printers. More particularly, it relates to the use of carboxylated lignin in water-based, ink jet inks. Most particularly, it relates to ink compositions with excellent water resistance properties while achieving excellent print quality, jetting properties, storage stability, reliability, and drying times.

2. Description of the Related Art (Including Information Disclosed Under 37 CFR 1.97 and 37 CFR 1.98)

Ink jet printing involves placement, in response to a digital signal, of small drops of a fluid ink onto a surface to form an image without physical contact between the printing device and the surface. The method of drop generation varies among the different ink jet technologies and can be used to classify ink jet printing into two major technology types, continuous (CIJ) and drop-on-demand (DOD).

In DOD printing systems, liquid ink droplets are propelled from a nozzle by heat (thermal or bubble ink jet) or by a pressure wave (piezo ink jet). All the ink droplets are used to form the printed image and are ejected as needed, "on demand." Thermal or bubble jet inks typically are based on water and glycols. Piezo ink jet systems generally use aqueous, solvent, or solid inks. These last inks, also known as phase change inks, are solid at ambient temperature and are liquid at printing temperatures.

In CIJ printing systems, a continuous stream of liquid ink droplets is ejected from a nozzle and is directed, with the assistance of an electrostatic charging device in close proximity to the print head, either to a substrate to form a printed image or to a recirculating system.

The following properties are required of an ink composition for ink jet printing:

(a) high quality printing (edge acuity and optical density) of text and graphics on substrates, (b) short dry time of the ink on a substrate such that the resulting printed image is not smudged when rubbed or offset onto a subsequent printed image placed upon the print, (c) good jetting properties exhibited by a lack of deviation of ink droplets from the flight path (misplaced dots) and of ink starvation during conditions of high ink demand (missing dots), (d) resistance of the ink after drying on a substrate to water and to abrasion, (e) long-term storage stability (no crust formation or pigment settling) and (f) long-term reliability (no corrosion or nozzle clogging).

Inks are known which possess one or more of the above listed properties. However, it is difficult to "design" an ink that possesses all of the above listed properties. Often, the inclusion of an ink component meant to satisfy one of the above requirements could prevent another requirement from being met. For example, the inclusion of a polymer in the ink composition can improve the water resistance of the ink on a substrate after drying. However, the polymer can cause a reduction in the print quality and optical density, as well as impair jetting properties and long-term storage stability. Thus, most commercial ink jet inks represent a compromise in an attempt to achieve at least an adequate response in meeting all of the above listed requirements.

The use of lignin binders in ink jet inks has been disclosed. Examples include U.S. Pat. Nos. 5,702,510 and 5,281,261 (the disclosures of which are hereby incorporated by reference), which teach the use of unmodified lignin in conjunction with other polymers.

Lignin is an amorphous, high-molecular weight polymer occurring naturally in most plant fibers. The primary commercial source of lignin is wood, particularly the wood used to make paper. The major types of lignin are kraft lignin, sulfite lignin, and orgnosolv lignin, each the by-product of a distinctive pulping process. Depending upon the conditions upon which lignin is precipitated, the precipitated lignin may be either in the form of free acid lignin or a lignin salt. If lignin is precipitated at a high pH, such as about 9.5 to 10, the lignin is obtained in the form of a salt. If this lignin is further processed by washing, acidifying to a low pH, such as about 2 to 5, and further washed so as to be substantially free of salt and ash-forming ingredients, free acid lignin, known as "A" lignin, is obtained. A monovalent salt of lignin, such as an alkali metal salt or an ammonium salt, is soluble in water, whereas free acid lignin and polyvalent metal salts of lignin are insoluble in water.

It is known to employ certain amine salts of lignins as binders in aqueous printing ink compositions, as shown in commonly assigned U.S. Pat. No. 4,891,070.

It is also known to use certain lignins as binding agents for water-based ink systems incorporating pigments and/or dispersed dyes. U.S. Pat. No. 2,525,433 discloses the use of lignin dissolved in water-miscible solvent as a binding material for a pigment in printing ink. The method of U.S. Pat. No. 2,525,433 requires the use of a solubilizing agent, generally an organic amine or alcohol, to completely dissolve the lignin particles. The resultant solution when used with pigments for ink application is limited to newsprint or other porous paper. There is no film-forming action of the lignin, and no solid particles remain after the lignin is solubilized. Adhesion to coated paper, calendered paper, and sized papers is poor with excessive rub-off resulting.

U.S. Pat. No. 4,957,557 (the disclosure of which is hereby incorporated by reference) teaches the use of this submicron or small particle lignin to produce carbon black ink compositions. Inks prepared with this type of lignin, however, are not storage-stable (particularly at elevated temperatures). Over time, viscosity increases and sediments are formed, or gel-like inks are obtained. This can reduce or eliminate the amount of ink jetted from an ink jet printer and can foul the heating element of thermal ink jet printers. The method of U.S. Pat. No. 5,192,361 (the disclosure of which is hereby incorporated by reference) teaches an improvement in storage stability obtained by replacing 10–25% of the lignin with either acrylic resin, rosin resins, styrene-maleic anhydride copolymer resin, or a combination thereof. While improving storage stability, this method introduces several negative attributes with respect to its practice in ink jet ink printing. First, migration of the acrylic resin, rosin resin, or stryene-maleic anhydride copolymer resin can occur independent of the lignin when the ink in which they are contained is printed on porous substrates such as uncoated cellulosic papers. This negatively impacts the quality of the printed image. Second, the inclusion of acrylic resins, rosin resins, or styrene-maleic anhydride copolymer resins in place of lignin reduces the performance enhancing properties of the lignin in an ink jet ink. That is, the degree to which the lignin improves optical density, print quality, and drying speed decreases.

Accordingly, an object of the present invention is to provide an improved ink composition comprising a modified lignin by-product of a kraft pulping process capable of satisfying simultaneously the properties required of an ink composition for ink jet printing, especially the aforementioned properties (a) to (f). Another object of the instant invention is directed to preparation of a modified lignin by-product that provides an ink composition for ink jet printing with reduced water sensitivity and improved optical density. Another advantageous feature of the invention is to provide an ink that has excellent filterability such that the ink can be filtered without ruining the filters upon its formulation. Other objects and advantages of the present invention will become apparent from the following disclosure.

SUMMARY OF INVENTION

The above-recited objects are met in the present invention of an ink jet ink composition comprising:

(a) from about 40% to about 98% of a water-based solvent system (carrier medium), (b) from about 1% to about 20% of one or more colorants, and (c) from about 0.1% to about 20% of carboxylated lignin.

The lignin is preferably a lignin by-product of a kraft wood pulping process for papermaking. It has been found that ink jet ink formulations in accordance with this invention have improved water resistance properties while achieving excellent print quality, jetting properties, storage stability, reliability, and drying times.

DESCRIPTION OF THE PREFERRED EMBODIMENT(S)

The ink compositions employed in the practice of the present invention include a carrier medium comprised of water or a mixture of water and at least one water-soluble organic component. The carrier medium is present from about 40 to 98% by weight, preferably from about 70 to 95%, based on the total weight of ink.

Suitable water-soluble organic components include: alcohols, such as methyl alcohol, ethyl alcohol, n-propyl alcohol, isopropyl alcohol, n-butyl alcohol, sec-butyl alcohol, or tert-butyl alcohol; amides, such as dimethylformamide or dimethylacetamide; carboxylic acids; esters, such as ethyl acetate, ethyl lactate, and ethylene carbonate; ethers, such as tetrahydrofuran or dioxane; glycerin; glycols; glycol esters; glycol ethers; ketones, such as acetone, diacetone, or methyl ethyl ketone; lactams, such as N-isopropyl caprolactam or N-ethyl valerolactam; lactones, such as butyrolactone; organosulfides; sulfones, such as dimethylsulfone; organosulfoxides, such as dimethyl sulfoxide or tetramethylene sulfoxide; and derivatives thereof and mixtures thereof. Among these components, an alcohol (such as ethanol) and a glycol (such as diethylene glycol) are preferred.

The ink compositions typically contain at least one glycol that serves as a humectant to prevent drying of the compositions during the printing operation, as well as during storage of the compositions. Glycols suitably employed in the practice of the compositions include ethylene glycol, diethylene glycol, triethylene glycol, tetraethylene glycol, propylene glycol, dipropylene glycol, glycerine, and polyethylene glycol. Polyethylene glycol is the preferred glycol. The humectant typically is present in an amount up to 30 percent by weight based on the weight of the composition, and preferably from about 2 to about 15 percent by weight.

The carrier media combinations used in the ink compositions must be compatible with the colorant so that flocculation or settling does not occur as a result of incompatibility. Also, the media combinations must be compatible with the materials of construction of the print head.

No particular limitation is imposed on the type or the amount of colorant used. Any pigment or dye that is soluble and dispersible in the solvent and is compatible with ink jet printing may be employed in the practice of the invention. One skilled in the art will be able to ascertain such operable colorants through reference to information as contained in the Color Index Guide. The amount of colorant employed in the practice of the invention is not critical and can be varied within relatively broad ranges. In general, the colorants are present in the composition in amounts varying from about 0.1 to about 10 percent and preferably from about 0.5 to about 5 percent, based on the weight of the ink compositions.

Attempts to employ lignin by-products recovered from kraft pulping liquors in water-based ink systems have met with certain problems. To dissolve the lignin in the water-based composition, it has been proposed to render the lignin water-soluble by addition of an amine compound to form a water-soluble salt of the lignin. Examples of such organic amine compounds are: mono-, di-, or triethanolamine; mono-, di-, and trimethyl (ethyl) amine; and mono-, di-, and triphenylamine. However, a large number of lignin insolubles remain in the aqueous lignin amine composition, causing unacceptable sludging and highly variable viscosities in the printing compositions. A consistent and stable viscosity is necessary for use of the lignin as an additive in water-based ink jet ink compositions. In addition, elimination of the presence of sludge is required in order to prevent clogging of the ink jet ink nozzles and fouling of the heating elements (in the case of thermal in jet ink printers).

The instant invention overcomes the aforementioned problems by reacting the lignin with a component such that the lignin possesses greater water solubility. In this manner, lignin insolubles are rendered soluble since a site for amine attachment is provided. In addition, by increasing the water solubility of the water-soluble lignin fraction, changes in viscosity are reduced. Methods for functionalizing lignin to improve water solubility include reacting the lignin with chloroacetic acid, maleic anhydride, fumaric acid, acrylic acid, and propiolactone. A preferred method involves reacting lignin with chloroacetic acid in an aqueous-based solvent system at a temperature of from about 70° C. to about 140° C.

A preferable amount of the carboxylated lignin to be used in the ink jet ink formulation varies according to the molecular weight of the lignin. In general, the carboxylated lignins of the instant invention are present in the ink jet compositions in amounts varying from about 0.1 to about 20 percent and preferably from about 1 to about 10 percent, based on the weight of the ink compositions.

Suitable conductivity control components optionally may be present to give the ink composition the conductivity necessary for projection by deflected continuous jet. These include, among others, salts of alkali metals and alkaline earth metal halides, nitrates, thiocyanates, acetates, sulfates, propionates, and amine salts. Examples of such salts are potassium thiocyanate, tetraethylammonium chloride, and lithium nitrate. The salts are typically used in an amount of 0.1 to 3 percent by weight of the composition and preferably from about 0.5 to about 1.5 percent by weight.

The ink compositions of the present invention also may be formulated to include one or more surfactants to impart desirable characteristics to the liquid ink compositions. Preferred surfactants include non-ionic surfactants such as DOW CORNING® 65 Additive, a silicone emulsion supplied by Dow Coming.

Consistent with the requirements of this invention, other agents may be incorporated in the ink composition such as agents to prevent intercolor bleed, anticurl and anticockle agents, antiseptic agents, biocides, chelating agents, corrosion inhibitors, desizing agents, mildewproofing agents, penetration promoters, pH adjusters and maintainers, pigment dispersants, resins, surface tension modifiers, and viscosity modifiers. Unless otherwise indicated, the amounts of the components of the compositions are given below in terms of weight percent (wt. %).

The inks of the present invention are particularly suited for ink jet printers. Inks suitable for use in ink jet printers should have a surface tension in the range of from about 20 to 70 dyne/cm, more preferably, in the range of from about 25 to 40 dyne/cm. The viscosity of the inks should be no greater than 20 cP at 25° C., and preferably below 5 cP. The pH of the inks should be from about 7.5 to about 11, preferably from about 8 to 9.5. The inks must be stable to long term storage and to changes in temperature and relative humidity. In addition, they must dry quickly on the substrate but must not bleed through the substrate. The inks may be adapted to meet the requirements of a particular printer to provide a balance of optical density, water fastness, smear resistance, drying rate, light stability, chemical resistance, and cost. No limitation is placed on the order in which the components of the ink compositions are combined or the method in which they are combined.

There is no limitation placed on the recording medium used in conjunction with the above printing methods. Any suitable substrate can be employed, including conventional cellulosic papers such as copying paper and bond paper, silica coated papers, glass, aluminum, rubber, vinyl, fabrics, textile products, plastics, polymeric films, wood, and the like.

The present invention will now be described in more detail through the use of the following examples. The examples are presented for illustrative purposes only, and are not intended to restrict the scope of the invention.

EXAMPLE 1

Into a 500 mL, three-neck, round bottom flask equipped with a thermometer, overhead stirrer, and condenser were charged 27.4 parts softwood lignin (lignin "A" obtained from Westvaco Corporation), 65 parts deionized water, and 12.8 parts of a 50% aqueous solution of sodium hydroxide. Then, 11.7 parts chloroacetic acid, sodium salt dissolved in 32.7 parts deionized water was added over an eight-minute period. The temperature of the reaction mixture was increased to 95° C. and was maintained for 3.5 hours. The resulting modified lignin solution had a pH of 7.4 and percent solids of 26.9.

EXAMPLE 2

Into a 500 ml, three-neck, round bottom flask equipped with a thermometer, overhead stirrer, and condenser were charged 26.7 parts softwood lignin (lignin "A" obtained from Westvaco), 78.3 parts deionized water, and 5.4 parts of a 50% aqueous solution of sodium hydroxide. Then, 7.3 parts chloroacetic acid, sodium salt dissolved in 21.7 parts deionized water was added over a five minute period. The temperature of the reaction mixture was increased to 95° C. and was maintained for five hours. The resulting modified lignin solution had a pH of 6.6 and a percent solids of 24.2.

EXAMPLE 3

An ink jet ink was prepared by mixing 15.5 parts deionized water, 5 parts LIPONIC EG-1 (Lipo Chemicals, Inc.), 10 parts ethylene glycol, 12.5 parts BONJET CW-1 (a black pigment supplied by Orient Chemical Co., 20% solids), 0.1 part PROXEL® GXL (a biocide supplied by Zeneca), 0.1 part DOW CORNING® 65 Additive (a silicone emulsion supplied by Dow Corning), and 12 parts of the modified lignin solution described in Example 1. The pH of the ink was adjusted to 9.1 with ammonium hydroxide. The ink had a viscosity of 3.8 cP (#1 Shell cup). Filtration of the ink was accomplished using a membrane filter having a pore size of 0.45 $\mu$m (ACRODISC® CR PTFE, supplied by Gelman Sciences).

The ink jet composition of this example was placed in a Hewlett Packard 51645A ink jet printer cartridge and was printed on uncoated paper (Nashua Dataprint Dual-Purpose Xerographic Bond, Nashua Office Products) using a Hewlett Packard DESKJET® HP 855 Cse thermal ink jet printer. The ink dried within seconds on impact on the paper and the resulting printed image possessed good print quality. No indication of poor jetting was observed. Several minutes after drying, the printed image was evaluated for water fastness by allowing a 0.5 mL drop of deionized water to run across the printed image. A significant amount of colorant was not displaced.

EXAMPLE 4

An ink jet ink was prepared by mixing 15.5 parts deionized water, 5 parts LIPONIC EG-1 (Lipo Chemicals, Inc.), 10 parts ethylene glycol, 12.5 parts BONJET CW-1 (a black pigment supplied by Orient Chemical Co., 20% solids), 0.1 part PROXEL® GXL (a biocide supplied by Zeneca), 0.1 part DOW CORNING® 65 Additive (a silicone emulsion supplied by Dow Coming), and 12 parts of the modified lignin solution described in Example 2. The pH of the ink was adjusted to 10.1 with ammonium hydroxide. The ink had a viscosity of 4.2 cP (#1 Shell cup). Filtration of the ink was accomplished using a membrane filter having a pore size of 0.45 $\mu$m (ACRODISC® CR PTFE, supplied by Gelman Sciences).

The ink jet composition of this example was placed in a Hewlett Packard 51645A ink jet printer cartridge and was printed on uncoated paper (Nashua Dataprint Dual-Purpose Xerographic Bond, Nashua Office Products) using a Hewlett Packard DESKJET® HP 855 Cse thermal ink jet printer. The ink dried within seconds on impact on the paper and the resulting printed image possessed good print quality. No indication of poor jetting was observed.

Several minutes after drying, the printed image was evaluated for water fastness by allowing a 0.5 mL drop of deionized water to run across the printed image. A significant amount of colorant was not displaced.

EXAMPLE 5

To provide a comparative example, an ink jet ink was prepared by mixing 73 parts deionized water, 10 parts LIPONIC EG-1 (Lipo Chemicals, Inc.), 10 parts ethylene glycol, 5 parts BONJET CW-1 (a black pigment supplied by Orient Chemical Co., 20% solids), 0.1 part PROXEL® GXL (a biocide supplied by Zeneca), 0.1 part DOW CORNING® 65 Additive (a silicone emulsion supplied by Dow Coming), and 2 parts Westvaco INDULIN® AT (a lignin supplied by Westvaco Corp.). The pH of the ink was adjusted to 9.1 with ammonium hydroxide. The ink had a viscosity of 3.1 cP (#1

Shell cup). Filtration of the ink was accomplished using a membrane filter having a pore size of 0.45 μm (ACRODISC® CR PTFE, supplied by Gelman Sciences).

The ink jet composition of this example was placed in a Hewlett Packard 51645A ink jet printer cartridge and was printed on uncoated paper (Nashua Dataprint Dual-Purpose Xerographic Bond, Nashua Office Products) using a Hewlett Packard DESKJET® HP 855 Cse thermal ink jet printer. The ink dried within seconds on impact on the paper and the resulting printed image was poor in print quality. In addition, the optical density of the printed image was at least 20% lower than the optical density of the printed images obtained in Examples 3 and 4.

Several minutes after drying, the printed image was evaluated for water fastness by allowing a 0.5 mL drop of deionized water to run across the printed image. A significant amount of colorant was not displaced.

Therefore, that which the inventor considers to be the subject matter of the invention is:

(1) An ink jet ink composition comprising:
 (a) from about 40% to about 98% of a water-based solvent system (carrier medium),
 (b) from about 1% to about 20% of one or more colorants, and
 (c) from about 0.1% to about 20% of carboxylated lignin;

(2) the ink jet ink composition of (1) further comprising a carrier medium comprised of a member of the group consisting of water and a mixture of water and at least one water-soluble organic component;

(3) the ink jet ink composition of (2) wherein the carrier medium is present from about 40 to 98% by weight, preferably from about 70 to 95%, based on the total weight of ink;

(4) the ink jet ink composition of (3) wherein the carrier medium is present from about 70 to 95%, based on the total weight of ink;

(5) the ink jet ink composition of (2) wherein water-soluble organic component is selected from the group consisting of an alcohols, amides, carboxylic acids, esters, ethers, glycerin, glycols, glycol esters, glycol ethers, ketones, lactams, lactones, organosulfides, sulfones, organosulfoxides, derivatives thereof and mixtures thereof;

(6) the ink jet ink composition of (5) wherein the alcohol is selected from the group consising of methyl alcohol, ethyl alcohol, n-propyl alcohol, isopropyl alcohol, n-butyl alcohol, sec-butyl alcohol, and tert-butyl alcohol;

(7) the ink jet ink composition of (5) wherein the amide is selected from the group consisting of dimethylformamide and dimethylacetamide;

(8) the ink jet ink composition of (5) wherein the ester is selected from the group consisting of ethyl acetate, ethyl lactate, and ethylene carbonate;

(9) the ink jet ink composition of (5) wherein the ether is selected from the group consisting of tetrahydrofuran and dioxane;

(10) the ink jet ink composition of (5) wherein the ketone is selected from the group consisting of acetone, diacetone, and methyl ethyl ketone;

(11) the ink jet ink composition of (5) wherein the lactam is selected from the group consisting of N-isopropyl caprolactam and N-ethyl valerolactam;

(12) the ink jet ink composition of (5) wherein the lactone butyrolactone;

(13) the ink jet ink composition of (5) wherein the sulfone is dimethylsulfone;

(14) the ink jet ink composition of (5) wherein the organosulfoxide is dimethyl sulfoxide and tetramethylene sulfoxide;

(15) the ink jet ink composition of (6) wherein the alcohol is ethanol;

(16) the ink jet ink composition of (6) wherein the glycol is diethylene glycol;

(17) the ink jet ink composition of (1) further comprising a humectant selected from a member of the group consisting of ethylene glycol, diethylene glycol, triethylene glycol, tetraethylene glycol, propylene glycol, dipropylene glycol, glycerine, and polyethylene glycol;

(18) the ink jet ink composition of (17) wherein the glycol is present in the amount up to 30 percent by weight based on the weight of the composition;

(19) the ink jet ink composition of (18) wherein the glycol is present in the amount from about 2 to about 15 percent by weight;

(20) the ink jet ink composition of (1) wherein the colorant is selected from the group consisting of pigments and dyes;

(21) the ink jet ink composition of (20) wherein the colorant is present in an amount from about 0.1 to about 10%, based on the weight of the ink composition;

(22) the ink jet ink composition of (21) wherein the colorant is present in an amount from about 0.5 to about 5%, based on the weight of the ink composition;

(23) the ink jet ink composition of (1) wherein the carboxylated lignin is produced by the reaction of a lignin by-product of kraft wood pulping with a member of the group consisting of chloroacetic acid, maleic anhydride, fumaric acid, acrylic acid, and propiolactone;

(24) the ink jet ink composition of (23) wherein the reaction occurs in an aqueous-based solvent system at a temperature of from about 70° C. to about 140° C.;

(25) the ink jet ink composition of (24) wherein the carboxylated lignin is present in an amount of from about 0.1 to about 20%, based on the weight of the ink composition;

(26) the ink jet ink composition of (23) wherein the carboxylated lignin is present in an amount of from about 1.0 to about 10%, based on the weight of the ink composition;

(27) the ink jet ink composition of (1) characterized by a surface tension of from about 20 to 70 dyne/cm, a viscosity no greater than 20 cP at 25° C., and pH value from about 7.5 to about 11;

(28) the ink jet ink composition of (27) characterized by a surface tension of from about 25 to 40 dyne/cm, a viscosity below 5 cP at 25° C., and a pH value from about 8 to about 9.5; and

(29) the ink jet ink composition of (1) further comprising agents selected from the group consisting of intercolor bleed preventives, anticurl and anticockle agents, antiseptic agents, biocides, chelating agents, corrosion inhibitors, desizing agents, mildewproofing agents, penetration promoters, pH adjusters and maintainers, pigment dispersants, resins, surface tension modifiers, and viscosity modifiers.

While the invention has been described and illustrated herein by references to various specific materials, procedures, and examples, it is understood that the invention is not restricted to the particular materials, combination of materials, and procedures selected for that purpose. Numerous variations of such details can be employed, as will be appreciated by those skilled in the art.

What is claimed is:

1. An ink jet ink composition comprising:
   (a) from about 40% to about 98% of a water-based solvent system (carrier medium),
   (b) from about 1% to about 20% of one or more colorants, and
   (c) from about 0.1% to about 20% of carboxylated lignin.

2. The ink jet ink composition of claim 1 further comprising a carrier medium comprised of a member of the group consisting of water and a mixture of water and at least one water-soluble organic component.

3. The ink jet ink composition of claim 2 wherein the carrier medium is present from about 40 to 98% by weight, preferably from about 70 to 95%, based on the total weight of ink.

4. The ink jet ink composition of claim 3 wherein the carrier medium is present from about 70 to 95%, based on the total weight of ink.

5. The ink jet ink composition of claim 2 wherein water-soluble organic component is selected from the group consisting of an alcohols, amides, carboxylic acids, esters, ethers, glycerin, glycols, glycol esters, glycol ethers, ketones, lactams, lactones, organosulfides, sulfones, organosulfoxides, derivatives thereof and mixtures thereof.

6. The ink jet ink composition of claim 5 wherein the alcohol is selected from the group consising of methyl alcohol, ethyl alcohol, n-propyl alcohol, isopropyl alcohol, n-butyl alcohol, sec-butyl alcohol, and tert-butyl alcohol.

7. The ink jet ink composition of claim 5 wherein the amide is selected from the group consisting of dimethylformamide and dimethylacetamide.

8. The ink jet ink composition of claim 5 wherein the ester is selected from the group consisting of ethyl acetate, ethyl lactate, and ethylene carbonate.

9. The ink jet ink composition of claim 5 wherein the ether is selected from the group consisting of tetrahydrofuran and dioxane.

10. The ink jet ink composition of claim 5 wherein the ketone is selected from the group consisting of acetone, diacetone, and methyl ethyl ketone.

11. The ink jet ink composition of claim 5 wherein the lactam is selected from the group consisting of N-isopropyl caprolactam and N-ethyl valerolactam.

12. The ink jet ink composition of claim 5 wherein the lactone butyrolactone.

13. The ink jet ink composition of claim 5 wherein the sulfone is dimethylsulfone.

14. The ink jet ink composition of claim 5 wherein the organosulfoxide is dimethyl sulfoxide and tetramethylene sulfoxide.

15. The ink jet ink composition of claim 6 wherein the alcohol is ethanol.

16. The ink jet ink composition of claim 6 wherein the glycol is diethylene glycol.

17. The ink jet ink composition of claim 1 further comprising a humectant selected from a member of the group consisting of ethylene glycol, diethylene glycol, triethylene glycol, tetraethylene glycol, propylene glycol, dipropylene glycol, glycerine, and polyethylene glycol.

18. The ink jet ink composition of claim 17 wherein the glycol is present in the amount up to 30 percent by weight based on the weight of the composition.

19. The ink jet ink composition of claim 18 wherein the glycol is present in the amount from about 2 to about 15 percent by weight.

20. The ink jet ink composition of claim 1 wherein the colorant is selected from the group consisting of pigments and dyes.

21. The ink jet ink composition of claim 20 wherein the colorant is present in an amount from about 0.1 to about 10%, based on the weight of the ink composition.

22. The ink jet ink composition of claim 21 wherein the colorant is present in an amount from about 0.5 to about 5%, based on the weight of the ink composition.

23. The ink jet ink composition of claim 1 wherein the carboxylated lignin is produced by the reaction of a lignin by-product of kraft wood pulping with a member of the group consisting of chloroacetic acid, maleic anhydride, fumaric acid, acrylic acid, and propiolactone.

24. The ink jet ink composition of claim 23 wherein the reaction occurs in an aqueous-based solvent system at a temperature of from about 70° C. to about 140° C.

25. The ink jet ink composition of claim 24 wherein the carboxylated lignin is present in an amount of from about 0.1 to about 20%, based on the weight of the ink composition.

26. The ink jet ink composition of claim 23 wherein the carboxylated lignin is present in an amount of from about 1.0 to about 10%, based on the weight of the ink composition.

27. The ink jet ink composition of claim 1 characterized by a surface tension of from about 20 to 70 dyne/cm, a viscosity no greater than 20 cP at 25° C., and pH value from about 7.5 to about 11.

28. The ink jet ink composition of claim 27 characterized by a surface tension of from about 25 to 40 dyne/cm, a viscosity below 5 cP at 25° C., and a pH value from about 8 to about 9.5.

29. The ink jet ink composition of claim 1 further comprising agents selected from the group consisting of inter-color bleed preventives, anticurl and anticockle agents, antiseptic agents, biocides, chelating agents, corrosion inhibitors, desizing agents, mildewproofing agents, penetration promoters, pH adjusters and maintainers, pigment dispersants, resins, surface tension modifiers, and viscosity modifiers.

* * * * *